R. H. & W. C. BENT.
FOOD PRODUCT AND PROCESS OF MAKING THE SAME.
APPLICATION FILED AUG. 13, 1915.
1,222,062.
Patented Apr. 10, 1917.
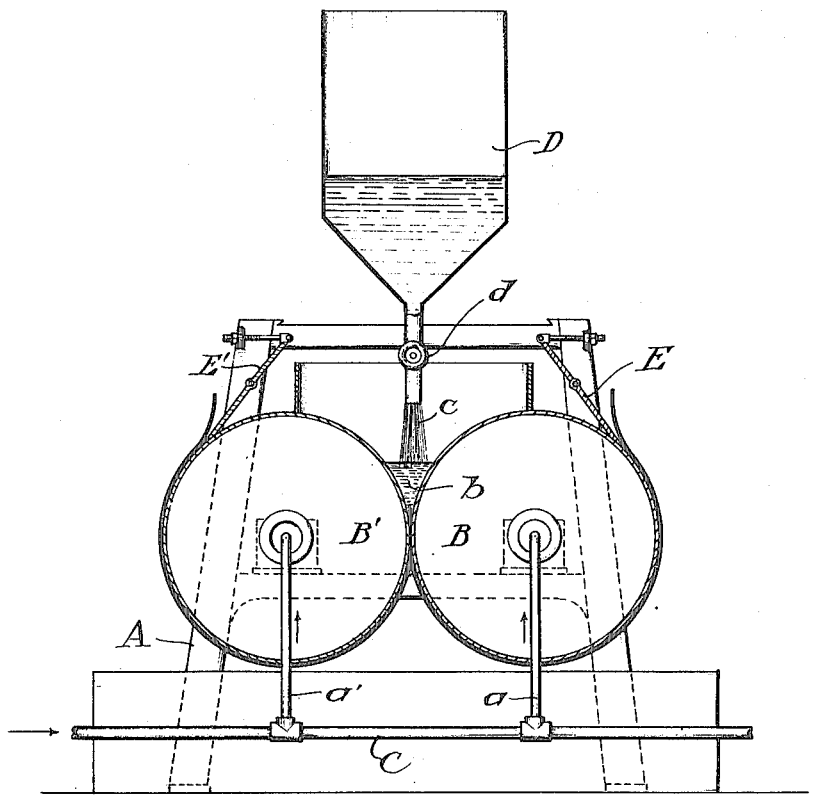
WITNESSES:
C. Gabriske
INVENTORS
Roy H. Bent and
Wynn C. Bent.
BY
Jas. H. Griffin
Attorneys

UNITED STATES PATENT OFFICE.

ROY H. BENT AND WYNN C. BENT, OF ANTWERP, NEW YORK.

FOOD PRODUCT AND PROCESS OF MAKING THE SAME.

1,222,062.     Specification of Letters Patent.     Patented Apr. 10, 1917.

Application filed August 13, 1915. Serial No. 45,297.

*To all whom it may concern:*

Be it known that we, ROY H. BENT and WYNN C. BENT, citizens of the United States, residing at Antwerp, Jefferson county, State of New York, have invented certain new and useful Food Products and Processes of Making the Same, of which the following is a specification.

This invention relates to food products, more particularly soups, the basis of which is milk and which can be readily prepared for use by merely mixing the soup products with hot water.

We prepare soup products having the form of homogeneous, distinct flakes or particles, each of which is composed of dried milk, in one form or other, and with which is combined the particular ingredient or ingredients which is to characterize the soup, such as tomatoes, peas, beans, corn, potatoes, celery, asparagus, cauliflower, onions, etc., preferably in the form of an extract or pulp of the particular vegetable or vegetables used. It will be understood of course, that the products may be seasoned as desired, as, *e. g.*, with pepper, salt, or other condiments, and, moreover, that in some cases, a harmless preservative may be added, such as cane sugar.

In practically carrying out the invention, we may use whole milk, separated or skimmed milk, condensed or evaporated milk, or milk which has been modified in any well known way, or any mixture of the foregoing lacteal products. In view of the tendency of whole milk, when dried, to slightly decompose, resulting in the undesirable formation of free fatty acids, we prefer to use separated milk, *i. e.*, the product resulting after the fats have been separated therefrom by a centrifugal machine, or otherwise. It will be understood, however, that the invention, from a generic standpoint, covers all forms, or any mixture thereof, of lacteal fluids.

The following process of making tomato soup will serve to illustrate one practical method of carrying our invention into effect.

We take fresh or canned tomatoes, and preferably cook them so as to thoroughly soften and disintegrate the pulp, and then pass the mass through a sieve or press. This results in a tomato extract containing the entire nutritious portion of the tomatoes, the seeds and skins, only, remaining behind. To the extract or pulp thus prepared we add the desired condiments, *e. g.*, pepper, red or black, salt, and, when necessary, the desired preservative, such as cane sugar or milk sugar. In making the tomato soup, we prefer to add, also, a small quantity of bicarbonate of soda, to neutralize the natural acid contained in the extract, as, otherwise, it has a tendency, when mixed with milk, to curdle the same, thereby interfering with the thorough mixing of the milk and tomato extract. If desired, the tomato extract or pulp may be used without cooking.

The proportions of the several ingredients mentioned which it is preferred to use are substantially ½ ounce of bicarbonate of soda, 2½ ounces of cane sugar, 1¾ ounces of salt, and ⅛ ounce of pepper, to 10 pounds of the tomato extract or pulp, although it will be understood that these proportions may be varied to suit the taste or the particular conditions of operation. The tomato extract and pulp made and treated as described is then mixed in the proportion of about 15% of the extract to 85% of skimmed milk by weight. If condensed, or whole milk be used, a somewhat less proportion thereof will suffice. The mixture thus prepared is evaporated to dryness, at a temperature in excess of 212 degrees Fahrenheit under ordinary conditions of atmospheric pressure. It is usually desirable to stir the mixture, intermittently or continuously, during the evaporation, in order to secure perfect homogeneity in the dried product. We may, also, if desired, conduct the evaporation in a vacuum, and, in some cases, superior products are thus obtained. As the methods of evaporation are well known, the details thereof need not be described.

In the accompanying drawings, we have shown diagrammatically, in side elevation, one form of apparatus which we have successfully used in conducting the evaporation.

Referring to the drawings, A is a framework which supports two revolving cylinders B B', said cylinders revolving toward each other in the directions indicated by the arrows. C is a steam main, from which steam is supplied to cylinder B through pipe *a*, and to cylinder B' through pipe *a'*. D is a hopper or feed supply for the material to be evaporated, said material being delivered to the space *b* between the cylinders by pipe *c* provided with a valve *d*, the feeding of the material being preferably at such rate that a small pool thereof is kept between the cylinders. Coöperating with cylinder B is a knife E, and coöperating with cylinder B' is a knife E', whereby the dried material is removed, in the form of a film, from said cylinders. Another form of evaporating apparatus which we may employ is illustrated in the patent to Just, No. 712,545, Nov. 4, 1902.

The dried product, obtained as described, may be sifted, and bolted if desired. This results in a completely sterilized product, in the form of distinct flakes or particles, each one of which contains all the ingredients of the mixture thoroughly and uniformly distributed through it. This product, moreover, is very permanent, i. e., it retains its original freshness under substantially all climatic conditions.

The product thus obtained has a high food value, is exceptionally nutritious and palatable, and may be immediately prepared for use by merely mixing with hot water, in any proportions desired.

While we use tomatoes in making our preferred soup, we may also, as stated above, use other vegetables, more particularly peas, beans, corn, potatoes, celery, asparagus, cauliflower and onions, and, in some cases, it may be desirable to combine two or more vegetables, e. g., corn and beans.

In operating with any of the foregoing vegetables, they are thoroughly cooked and thereafter pressed, the same as in the case of the tomatoes, thereby eliminating the skins or other fibrous and undesirable portions of the vegetables. To the vegetable extracts thus prepared are added the desired condiments, whereupon they are mixed with the milk, and evaporated as heretofore described. The proportions of vegetables mixed with the milk may vary from 5 to 50 per cent. of the weight of the milk, depending upon the richness of the particular vegetable used; e. g., a smaller portion of peas and beans would be required, because of their large content of proteids, than would be the case with corn or potatoes.

It will be understood that the procedure outlined may be varied as to details, and also as to the precise ingredients employed, without departing from the spirit of the invention, the salient feature of which, in its specific form, consists in a soup product composed of distinct, homogeneous flakes or particles, each of which embodies the combination of dried milk and dried vegetable extract. It will be understood, further, that the product thus prepared may, if desired, be mixed with other dried ingredients or substances, without departing from the spirit of the invention.

In using the term vegetable, or vegetable extract, herein, we desire to have it understood that we do not include cocoa or chocolate, as these are products of the cocoa-bean and are not a vegetable in the sense in which we use the term.

Having thus fully described the invention, what we claim as new, and desire to secure by Letters Patent, is:

1. The herein described food product, consisting of dry, homogeneous particles or flakes containing a dried lacteal product and a dried edible vegetable extract.

2. The herein described food product, consisting of dry, homogeneous particles or flakes containing dried milk and a dried succulent vegetable.

3. The herein described food product, consisting of dry, homogeneous particles or flakes containing dried milk and evaporated tomatoes.

4. The herein described food product, consisting of dry, homogeneous particles or flakes containing dried milk and dried tomato extract.

5. The herein described food product, consisting of dry, homogeneous particles or flakes containing dried milk, dried tomato extract and sugar.

6. The herein described process of preparing dry soup products, which consists in making a mixture of a lacteal fluid and a vegetable extract or pulp, and evaporating the same to dryness.

7. The herein described process of preparing dry soup products, which consists in making a mixture of milk and tomato pulp, and evaporating the same to dryness.

8. The herein described process of preparing dry soup products, which consists in making a mixture of milk and cooked tomato pulp, and evaporating the same to dryness.

9. The herein described process of preparing dry soup products, which consists in making a mixture of milk and a vegetable extract or pulp, and evaporating the fluid therefrom by heating the said mixture, in a thin film, upon a suitable surface exposed to a temperature in excess of 212 degrees Fahrenheit.

10. The herein described process of preparing dry soup products, which consists in making a mixture of milk and a vegetable extract or pulp, evaporating the fluid therefrom by heating the said mixture, in a thin film, upon a suitable surface exposed to a temperature in excess of 212 degrees Fahrenheit, and then reducing the resulting dried product to a dry powder.

In testimony whereof we have signed our names to this specification.

ROY H. BENT.
WYNN C. BENT.